3,052,623
PROCESS FOR DEWAXING OF LUBE OILS AND DEOILING OF WAXES
Roy T. Edwards, Huntington, and Robert F. Westall, Jackson Heights, N.Y., assignors to Socony Mobil Oil Company, Inc., a corporation of New York
No Drawing. Filed Apr. 29, 1960, Ser. No. 25,553
4 Claims. (Cl. 208—31)

This invention relates to the separation of oil and wax, in petroleum stocks containing wax and is particularly concerned with a process for removing wax from oil or oil from wax in a rapid and efficient manner.

At present, dewaxing and deoiling operations are performed by mixing the waxy charge stock with a solvent mixture of a ketone such as methyl ethyl ketone and an aromatic solvent such as toluene to dissolve the charge stock at a suitably elevated temperature. The mixture is gradually cooled to an appropriate temperature required for precipitation of the wax and the wax is separated on the filter drum. The dewaxed oil is obtained by evaporation of the solvent and is useful as a lubricating oil of low pour point. The wax cake may be repulped one or more times with additional solvent and refiltered to provide deoiled wax having many useful applications.

The dewaxing and deoiling apparatus is expensive and complicated. In many instances, the filtration proceeds so slowly as to constitute a bottleneck in these operations. The filterability of an individual charge stock is related to such variables as the width of the distillation cut from which it is derived, the preciseness of fractionation in the distillation step, the nature of the waxes contained in the stock, the relative amount of wax present in comparison with the amount of oil, and the conditions employed in the preparation for the filtration step such as the composition of the solvent mixture, method of adding the solvent to the charge stock, amount of solvent dilution and solvent wash, and the rate of chilling of the wax-oil slurry prior to filtration.

We have found that the filtering operation can be conducted more rapidly by adding certain polymeric esters to the oil-wax liquid mixture prior to crystallization and subsequent filtration. This improvement greatly increases the capacity of the filter units. The small amount of additional cost for the ester addition is more than offset by the vastly improved filtration of the oil-wax slurry.

The ester added to the wax and oil mixture is a polymeric vinyl ester of organic acids having at least eight carbon atoms in the fatty acid chain. This material has the formula:

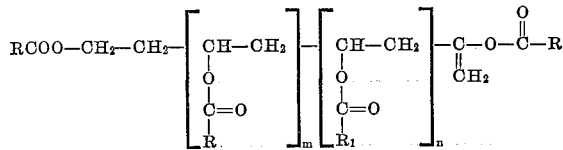

in which R and $R_1$ are alkyl radicals having between 8 and 24 carbon atoms in the hydrocarbon chain and $m$ and $n$ are integers, the sum of $m+n$ being between about 10 and about 1000 depending upon the molecular weight of the radicals R and $R_1$.

The addition of this polymerized vinyl ester in small amounts to wax-bearing petroleum stocks ranging from a light distillate to a heavy residual oil improves the filtration properties by increasing the rate of filtration and, in some cases, simultaneously increases the yield of oil.

The object of this invention is to increase the filtration rate of a wax bearing oil stock.

A further object of this invention is to increase the amount of oil obtained from a given wax bearing oil stock.

A further object of this invention is to permit a sizable increase in throughput of wax removing units without the capital expense of purchasing and installing additional filter surface.

A further object of this invention is to provide a process for providing a wax from a wax bearing oil stock which possesses enhanced properties for use as a coating wax.

A further object of this invention is to provide a process for providing a wax from a wax bearing oil stock which requires a reduced amount of solvent thereby reducing the amount of distillation equipment and refrigeration equipment required.

These and other objects of the invention will be made more apparent in the following detailed description of the invention.

The polymeric vinyl ester useful in this invention may be a homopolymer or a heteropolymer derived from a mixture of monomers. It is possible to have copolymerization in the formation of the esters of this invention, and these copolymers provide equally satisfactory results provided the other requirements are met. The polymeric vinyl esters of organic acids having fewer than eight carbon atoms in the chain are not readily compatible with waxy petroleum stocks and tend to separate on settling and are, therefore, not usable in improving filtration. When the carbon chain becomes unduly lengthy, incompatibility with the waxy stock again becomes pertinent and, further, other undesirable properties are encountered which make the upper limit of utility about 24, so that for purposes of this invention the carbon chain is limited between about 8 and about 24. A particularly preferred compound involves polymer of a mixture of vinyl stearate and vinyl palmitate being about 70 percent by weight vinyl stearate and about 30 percent vinyl palmitate. The average molecular weight of the polymeric vinyl ester may range from about 3000 to about 300,000 as measured by the Staudinger method (see T. E. McGoury and H. Nash report in A. Weissberger, Physical Methods of Organic Chemistry, chapter VIII, second edition). It is only required that the acid portion of the vinyl ester be chosen to provide good compatibility with the wax. The polymeric vinyl esters have a limited compatibility with petroleum wax with the high molecular weight polymers being more limited in this respect than the lower molecular weight material. The preferred polymeric vinyl esters are those having a molecular weight of about 5,000–90,000 (Staudinger method).

The invention has been tested using a variety of charge stocks to demonstrate the improved filtration obtained. The characteristics of these stocks are enumerated in Table I as follows:

TABLE I
Selected Waxy Stocks

| Type of stock | Light distillate | Heavy distillate | Residual |
| --- | --- | --- | --- |
| Material | Stock A raffinate. | Stock B furfural raffinate. | Stock C Duo-Sol raffinate. |
| Laboratory No | 135040 | X-20598 | X-20599. |
| Gravity, ° API | 36.8 | 29.1 | 21.3. |
| Pour point, ° F | +50 | +115 | +115. |
| Viscosity at— | | | |
| 100° F | 8.52/54 | | |
| 130° F | | 42.8/199 | |
| 210° F | | 10.70/62 | 29.6/141. |
| Flash point, Cleveland open cup ° F. | | 500 | 560. |

EXAMPLE I

The invention was tested using the preferred polymer being a polymer of 90,000 molecular weight and formed from about 70% vinyl stearate and 30% vinyl palmitate (suitable product being identified as Kyrax A [trade name] sold by Air Reduction Chemical Company), added to stock A raffinate as identified in Table I in comparison with a dewaxing run made of the oil without addition agents. The results were as follows:

| Run No. | 1 | 2 |
|---|---|---|
| Additive | None | (1) |
| Concentration, percent | | 0.01 |
| Solvent composition: | | |
| Percent methyl ethyl ketone | 55 | 55 |
| Percent toluol | 45 | 45 |
| Dilution ratio: | | |
| Primary | 1.0 | 1.0 |
| Secondary | .9 | .9 |
| Total | 1.9 | 1.9 |
| Wash ratio | 0.5 | 0.5 |
| Overall slurry cooling rate, °F./min | 7.2 | 8.2 |
| Filtration temperature, °F | 0 | 0 |
| Equivalent filter speed, m.p.r. | 3 | 3 |
| Equivalent submergence, percent | 50 | 50 |
| Vacuum, in. Hg: | | |
| Pickup | 4 | 4 |
| Wash | 24 | 24 |
| Cake thickness, in | 4/32 | 11/32 |
| Percent solvent in cake | 69.0 | 81.2 |
| Percent yield: | | |
| Wax | 7.2 | 9.1 |
| Oil | 92.8 | 90.9 |
| Wax solidification point, °F | 103.5 | 97.0 |
| Oil recovered: | | |
| Pour point, °F | +20 | +15 |
| Gravity, °API | 36.8 | 36.8 |
| Viscosity at 100° F | 2 9.08 | 3 8.84 |
| Filtration rate, g.s.f.h | 5.2 | 7.1 |
| Percent increase in rate | | 36.5 |

1 Kyrax A (trade name).
2 Centistokes/56 SUS.
3 Centistokes/55 SUS.

EXAMPLE II

As a second illustration of the invention the same charge stock was tested with the same additive but different solvent solution was used. The results with and without the additive were as follows:

| Run No. | 4 | 5 |
|---|---|---|
| Additive | None | (1) |
| Concentration, percent | | 0.01 |
| Solvent composition: Percent methyl isobutyl ketone | 100 | 100 |
| Dilution ratio: | | |
| Primary | 1.0 | 1.0 |
| Secondary | .9 | .9 |
| Total | 1.9 | 1.9 |
| Wash ratio | 0.5 | 0.5 |
| Overall slurry cooling rate, °F./min | 8.8 | 8.9 |
| Filtration temperature, °F | 0 | 0 |
| Equivalent filter speed, m.p.r. | 3 | 3 |
| Equivalent submergence, percent | 50 | 50 |
| Vacuum in. Hg: | | |
| Pickup | 4 | 4 |
| Wash | 24 | 24 |
| Cake thickness, in | 9/32 | 7/32 |
| Percent solvent in cake | 74.8 | 66.8 |
| Percent yield: | | |
| Wax | 8.4 | 9.6 |
| Oil | 91.6 | 80.4 |
| Wax solidification point, °F | 101.0 | 100.0 |
| Oil recovered: | | |
| Pour point, °F | +15 | +15 |
| Gravity, °API | 36.1 | 36.0 |
| Viscosity at 100° F | 2 8.95 | 3 9.05 |
| Filtration rate, g.s.f.h | 3.6 | 4.7 |
| Percent increase in rate | | 30.6 |

1 Kyrax A (trade name).
2 Centistokes/55 SUS.
3 Centistokes/56 SUS.

EXAMPLE III

The invention was tested using the stock B furfural raffinate as the charge stock, the details of this stock being enumerated in Table I. About 0.025% of the additive was supplied with the charge stock and the comparative results with and without additive were as follows:

| Run No. | 6 | 7 |
|---|---|---|
| Additive | None | (2) |
| Concentration, percent | | 0.025 |
| Solvent composition: | | |
| Percent methyl ethyl ketone | 50 | 50 |
| Percent toluol | 50 | 50 |
| Dilution ratio: | | |
| Primary | 1.2 | 1.2 |
| Secondary | 2.1 | 2.1 |
| Total | 3.3 | 3.3 |
| Wash ratio | 0.9 | 0.9 |
| Overall slurry cooling rate, °F./min | 7.5 | 7.4 |
| Filtration temperature, °F | 0 | 0 |
| Equivalent filter speed, m.p.r. | 3 | 3 |
| Equivalent submergence, percent | 50 | 50 |
| Vacuum, in. Hg: | | |
| Pickup | 5 | 5 |
| Wash | 20 | 20 |
| Cake thickness, in | 5/32 | 7/32 |
| Percent solvent in cake | 74.4 | 79.6 |
| Percent yield: | | |
| Wax | 20.9 | 17.4 |
| Oil | 79.1 | 82.6 |
| Wax solidification point, °F | 140.5 | 143.0 |
| Oil recovered: | | |
| Pour point, °F | +25 | +15 |
| Gravity, °API | 27.7 | 27.1 |
| Viscosity at 210° F | 3 11.98 | 3 12.37 |
| Filtration rate, g.s.f.h | 1.9 | 2.4 |
| Percent increase in rate | | 26.3 |

1 Kyrax A (trade name).
2 Centistokes/66 SUS.
3 Centistokes/68 SUS.

EXAMPLE IV

As a further illustration of the invention, stock C Duo-Sol raffinate, described in Table I was tested using 0.005% of the additive and the comparative results with and without the additive were as follows:

| Run No. | 9 | 10 |
|---|---|---|
| Additive | None | (1) |
| Concentration, percent | | 0.005 |
| Solvent composition: | | |
| Percent methyl ethyl ketone | 50 | 50 |
| Percent toluol | 50 | 50 |
| Dilution ratio: | | |
| Primary | 4 | 4 |
| Secondary | 0 | 0 |
| Total | 4 | 4 |
| Wash ratio | 0.8 | 0.8 |
| Overall slurry cooling rate, °F./min | 9.9 | 8.9 |
| Filtration temperature, °F | 0 | 0 |
| Equivalent filter speed, m.p.r. | 4 | 4 |
| Equivalent submergence, percent | 50 | 50 |
| Vacuum, in. Hg: | | |
| Pickup | 20 | 20 |
| Wash | 20 | 20 |
| Cake thickness, in | 5/32 | 5/32 |
| Percent solvent in cake | 56.2 | 41.1 |
| Percent yield: | | |
| Wax | 12.7 | 13.3 |
| Oil | 87.3 | 86.7 |
| Wax solidification point, °F | 155.0 | 153.0 |
| Oil recovered: Pour point, °F | +15 | +15 |
| Filtration rate, g.s.f.h | 4.2 | 4.8 |
| Percent increase in rate | | 14.3 |

1 Kyrax A (trade name).

The additive remains in the crude wax fractions after filtration and thus is still available for crystal modification in the wax deoiling stages, whether this is done by repulping or recrystallization. The finished wax is then percolated through a bed of adsorbent to improve the color and the additive passes through with the finished wax. Since this additive also effects an improvement of the mechanical properties of the wax, it is desirable that it remain in the wax. For example, small amounts of the additive improve the tensile strength of coating wax and hence make this wax more attractive for coating purposes.

All the experimental work reported previously was done using a filter leaf having an area of 0.1 square foot to simulate the operation of the continuous rotary drum vacuum filters which are operated commercially to perform dewaxing and deoiling operations. The use of a filter leaf in this manner is well established in engineering practice, see Symposium on Relationship Between Pilot-Scale and Commercial Chemical Engineering Equipment, a report of the White Sulphur Springs meeting on March 11–14, 1951, issued by the American Institute of Chemical Engineers. A brief outline of Filtration Leaf Tests appears on pages 968 and 969 of the 3rd edition of the Chemical Engineers Handbook, edited by J. H. Perry and published in 1950. In using the filter leaf, Example I, a part of the charge stock was dissolved at an elevated temperature in a suitable part by weight of the solvent. The slurry was then heated to the same temperature. The slurry was then cooled with vigorous agitation until the temperature reached a suitable low temperature, such as 0° F., the overall rate of cooling being 7.2° F. per minute. At this point, an additional amount of solvent previously chilled to a suitable low temperature, such as 0° F. was added to the concentrated slurry and agitated vigorously to insure uniformity. The weight of slurry was recorded after chilling, and the slurry stirred again before filtration. To begin the filtration, the 0.1 square foot filter leaf covered with a cloth similar to that used in commercial refineries was plunged into the slurry with the vacuum within the filter leaf adjusted to 4 inches of mercury. The leaf was left in the slurry for 90 seconds to simulate the length of the pickup cycle on a commercial continuous rotary drum vacuum filter being operated at a filter speed of 3 minutes per revolution and 50% submergence of the drum in the slurry. At the end of the 90 second pickup cycle, the leaf was removed from the slurry and given a 7.5 second initial drying period at 24 inches of mercury. To ascertain the amount of slurry used, the remaining slurry was weighed. Based on the amount used, the correct amount of wash was weighed and pulled through the cake at a vacuum of 24 inches of mercury, followed by a final drying period at the same vacuum for 15 seconds. The wax cake and filtrate were recovered, freed of solvent, weighed and the fractions submitted to testing. On the basis of the weights of the solvent-free fractions, the yields of wax and oil were computed. The filtration rate in gallons of dewaxed oil per square foot per hour (g./s.f.h.) was calculated from the weight of oil recovered, the gravity of the dewaxed oil, the filter surface (0.1 sq. ft.), and the number of filtration cycles possible per hour at the filter rotation speed used.

EXAMPLE V

A demonstration of the invention was made using a polymer having a molecular weight of 5,000 (Staudinger method) and formed from 70% vinyl stearate mixed with 30% vinyl palmitate. A blank run using the same oil without additive was made for comparison purposes. The demonstration was made utilizing a 6 inch I.D. jacketed Buchner funnel. The charge stock was a heavy distillate (Barco heavy vacuum gas oil adjacent to 14% residuum). For this test 300 grams of the charge stock were dissolved in 6 parts by weight of 50% methyl ethyl ketone and 50% toluene, chilled to 0° F. and filtered through Whatman (trade name) No. 42 paper in the jacketed 6" Buchner funnel. The wax cake was washed with 1 part by weight (based on the charge) of cold solvent. The time to complete the initial filtration and the washing was measured and used as the criteria of filtration rate. The following tabulation sumarizes the data obtained:

| Charge oil | Total filtration time, minutes | Percent wax yield | Softening point, °F. | Oil content, percent |
|---|---|---|---|---|
| Blank oil | 39 | 19.4 | 139 | 36.75 |
| Blank oil plus 0.1% additive | 16 | 10.8 | 146 | 4.36 |

EXAMPLE VI

A series of tests were conducted to demonstrate the effect of a 90,000 molecular weight ester formed from 70% vinyl stearate and 30% vinyl palmitate at various dilution ratios, using a duo-sol raffinate stock and a dry solvent mixture of 50% methyl ethyl ketone and 50% toluene. The results are shown in the following table.

*Effect of Additive on Dewaxing of Stock C D.S. Raffinate at Reduced Solvent Dosages Using Dry 50 MEK/50 Toluol*

| Run No. | Dilution ratio | Cooling rate °F. per min. | Percent additive | Oil yield, percent | VI. of oil | Filtration rate, g.s.f.h. | Cost of additive used, cents/bbl. of charge | Percent increase in rate |
|---|---|---|---|---|---|---|---|---|
| C72111 | 4.0 | 14.7 | | 82.7 | 95 | 2.3 | | |
| C72110 | 4.0 | 14.8 | 0.01 | 85.6 | 94 | 4.8 | 2.9 | 108.7 |
| C72122 | 3.5 | 15.3 | | 82.3 | 94 | 2.4 | | |
| C67899 | 3.5 | 14.3 | 0.01 | 84.6 | 95 | 4.2 | 2.9 | 75.0 |
| C72125 | 3.0 | 15.3 | | 80.0 | 94 | 2.1 | | |
| C72106 | 3.0 | 14.3 | 0.01 | 83.6 | 94 | 3.4 | 2.9 | 61.8 |
| C72126 | 2.5 | 15.7 | | 77.4 | 94 | 1.9 | | |
| C72123 | 2.5 | 15.6 | 0.01 | 83.8 | 94 | 2.3 | 2.9 | 21.0 |
| C72127 | 2.0 | 15.1 | | 83.0 | 75 | 1.3 | | |
| C72124 | 2.0 | 14.7 | 0.01 | 83.6 | 94 | 1.9 | 2.9 | 46.2 |

EXAMPLE VII

A series of tests were conducted to demonstrate the effect of a 90,000 molecular weight ester formed from 70% vinyl stearate and 30% vinyl palmitate at various dilution ratios, using a duo-sol raffinate stock and a wet solvent mixture of 50% methyl ethyl ketone and 50% toluene. The results are shown in the following table.

*Effect of Additive on Dewaxing of Stock 345 D.S. Raffinate at Reduced Solvent Dosages Using 50 MEK/50 Toluol (Saturated With Water at Room Temperature)*

| Run No. | Dilution ratio | Cooling rate °F. per min. | Percent additive | Oil yield, percent | V.I. of oil | Filtration rate, g.s.f.h. | Cost of additive used, cents/bbl. of charge | Percent increase in rate |
|---|---|---|---|---|---|---|---|---|
| C72120 | 4.0 | 15.8 |  | 83.0 | 93 | 2.6 |  |  |
| C72121 | 4.0 | 17.0 | 0.01 | 85.8 | 93 | 4.8 | 2.9 | 84.6 |
| C72128 | 3.5 | 14.1 |  | 85.5 | 95 | 3.1 |  |  |
| C72112 | 3.5 | 14.6 |  | 85.6 | 95 | 3.1 |  |  |
| C72116 | 3.5 | 15.5 | 0.01 | 84.5 | 94 | 3.9 | 2.9 | 25.8 |
| C72117 | 3.0 | 13.7 |  | 81.4 | 94 | 2.2 |  |  |
| C72115 | 3.0 | 14.5 | 0.01 | 84.2 | 93 | 3.1 | 2.9 | 40.8 |
| C72118 | 2.5 | 15.3 |  | 76.5 | 93 | 1.7 |  |  |
| C72114 | 2.5 | 14.0 | 0.01 | 82.9 | 94 | 2.8 | 2.9 | 64.7 |
| C72129 | 2.5 | 13.5 | 0.01 | 85.5 | 94 | 2.5 | 2.9 | 47.1 |
| C72119 | 2.0 | 13.8 |  | 77.8 | 95 | 1.6 |  |  |
| C72113 | 2.0 | 14.4 | 0.01 | 81.7 | 94 | 1.8 | 2.9 | 12.5 |

EXAMPLE VIII

An economic calculation has been made to show the savings in operation of a ketone unit when using the method of this invention in dewaxing and deoiling waxy stocks. These calculations and their bases are reported as follows:

ECONOMIC CALCULATIONS

In 1956 it cost one refinery 71 cents per barrel of charge stock to run the ketone units, of which 30 cents per barrel was for utilities (electricity, steam, refrigeration, etc.).

The approach currently being used for a rough indication of economic justification is as follows:

(1) Calculate savings in utilities costs obtained by reducing the amount of solvent circulation. This is being figured as a simple proportion.

(2) Deduct the cost of additive.

(3) Multiply the net savings times the daily charge rate in the refinery (4200 barels per day of stock C.D.S. raffinate) to obtain the savings per stream day.

(4) Then multiply the savings per stream day times the number of days on which the ketone unit ran C raffinate over the span of a calendar year for the most recent data available. This period encompassed 230 days' operation charging C raffinate.

A summary of these calculations follows:

|  | Current operation | With additive | Possibility with additive |
|---|---|---|---|
| Barrels of charge | 1 | 1 | 1 |
| Barrels of dilution solvent | 3.5 | 2.5 | 2.5 |
| Barrels of wash solvent | 0.8 | 0.8 | 0.4 |
| Total | 5.3 | 4.3 | 3.9 |
| Reduction in solvent circulation, bbls |  | 1.0 | 1.4 |
| Savings on utilities, cents |  | 5.7 | 7.9 |
| Cost of additive, cents |  | 2.9 | 2.9 |
| Net savings per bbl. of charge, cents |  | 2.8 | 5.0 |
| Net savings per stream day |  | $117.60 | $210.00 |
| Net savings per year |  | $27,038 | $48,300 |

The following Table II shows the effect of solvent composition on the response to use of the additive in dewaxing a heavy distillate:

TABLE II

*Effect of Solvent Composition on Additive Response in the Dewaxing of Barco Heavy Vacuum Gas Oil*

| Additive | None | (1) | None | (1) | None | (1) |
|---|---|---|---|---|---|---|
| Concentration, percent |  | 0.05 |  | 0.025 |  | 0.05 |
| Solvent composition: |  |  |  |  |  |  |
| Percent methyl ethyl ketone | 50 | 50 | 80 | 80 | 100 | 100 |
| Percent toluol | 50 | 50 | 20 | 20 | 0 | 0 |
| Dilution ratio: |  |  |  |  |  |  |
| Primary | 4 | 4 | 4 | 4 | 4 | 4 |
| Secondary |  |  |  |  |  |  |
| Total | 4 | 4 | 4 | 4 | 4 | 4 |
| Wash ratio | 0.8 | 0.8 | 0.8 | 0.8 | 0.8 | 0.8 |
| Overall slurry cooling rate, °F./min | 14.4 | 13.9 | 16.6 | 13.5 | 14.0 | 16.4 |
| Filtration temperature, °F | 0 | 0 | 0 | 0 | 25 | 25 |
| Equiv. filter speed, m.p.r. | 3 | 2 | 3 | 3 | 1 | 1 |
| Equiv. submergence, percent | 50 | 50 | 50 | 50 | 50 | 50 |
| Vacuum, in. Hg: |  |  |  |  |  |  |
| Pickup | 5 | 5 | 5 | 5 | 5 | 5 |
| Wash | 20 | 20 | 20 | 20 | 20 | 20 |
| Cake thickness, in | 5/32 | 1/32 | 11/32 | 8/32 | 9/32 | 7/32 |
| Percent solvent in cake | 88.4 | 48.1 | 73.2 | 69.5 | 59.8 | 38.4 |
| Percent yield: |  |  |  |  |  |  |
| Wax | 8.1 | 8.1 | 26.3 | 16.8 | 32.8 | 23.4 |
| Oil | 91.9 | 91.9 | 73.7 | 83.2 | 67.2 | 76.6 |
| Wax solidification pt., °F | 143.0 | 142.0 | 126.5 | 133.0 | 123.0 | 128.0 |
| Pour point of oil, °F | (+30) | (+30) | 0 | 0 | +5 | +10 |
| Filtration rate, g.s.f.h. | 2.0 | 2.6 | 3.0 | 3.6 | 7.5 | 14.5 |
| Cost of additive used, cents/bbl. of charge |  | 14.0 |  | 7.0 |  | 14.0 |
| Percent increase in rate |  | 30.0 |  | 20.0 |  | 93.3 |

[1] Kyrax A (trade name).

The significant features to be observed in Table II are the large increase in filtration rate obtained by increasing the methyl ethyl ketone content of the solvent and the much larger percent increase in rate produced by the additive at the highest ketone content.

The following Table III demonstrates the use of the additive to aid deoiling operations.

TABLE III

*Deoiling of a Residual Petrolatum*

| | | (¹) |
|---|---|---|
| Additive | None | 0.08 |
| Concentration, percent | None | |
| Solvent composition: | | |
| Percent methyl ethyl ketone | 50 | 50 |
| Percent toluol | 50 | 50 |
| Dilution ratio: | | |
| Primary | 8 | 8 |
| Secondary | | |
| Total | 8 | 8 |
| Wash ratio | 1.5 | 1.5 |
| Overall slurry cooling rate, °F./min | 9.5 | 7.9 |
| Filtration temperature, °F | 50 | 50 |
| Equiv. filter speed, m.p.r | 2 | 2 |
| Equivalent submergence, percent | 50 | 50 |
| Vacuum, in. Hg: | | |
| Pickup | 2.5 | 2.5 |
| Wash | 20 | 20 |
| Cake thickness, in | 8/32 | 10/32 |
| Percent solvent in cake | 66.1 | 46.9 |
| Percent yield: | | |
| Wax | 37.0 | 34.7 |
| Foots oil | 63.0 | 65.3 |
| Wax solidification point, °F | 165.5 | 167.5 |
| Filtration rate, p.s.f.h | 11.6 | 17.2 |
| Percent increase in rate | | 48.3 |

¹ Kyrax A (trade name).

The additive concentration employed in the tests used to prepare Table III is approximately the amount that would be left in the residual petrolatum if 0.01% additive were used for dewaxing the parent residual raffinate. Thus, the same incremental supply of additive serves to enhance filtration in both the dewaxing of the raffinate for lube oil and the deoiling of petrolatum for microcrystalline wax production. The additive is also effective in the deoiling of other oily waxes.

The concentration of additive in the waxy oil stock will vary to some extent with different additives and different stocks. The broad range may be from about 0.001 to 5% by weight whereas the preferred range is about 0.005 to 1% by weight. While methyl ethyl ketone mixed with toluene or benzene is quite commonly employed as a solvent in dewaxing or deoiling operations, the invention is of course not limited to the use of this solvent. As indicated hereinabove, methyl isobutyl ketone may be employed as the solvent. Also other solvents may be employed, such as pure toluene, or benzene or various other well known solvents. The invention is effective with the different solvents, although the degree of effectiveness will vary to some extent as different solvents are employed.

The examples of the invention given hereinabove were presented only to demonstrate the invention and are not intended as a limitation of the scope of the invention. The only limitations intended are those found in the attached claims.

We claim:

1. The improved method of dewaxing mineral oils and deoiling waxes which comprises adding to a waxy mineral oil between about 0.005–1.00% by weight of a polymeric vinyl ester formed from a mixture of 70% vinyl stearate and 30% vinyl palmitate in which the molecular weight of the copolymer is between about 5,000 to 90,000, dissolving the mixture in a suitable solvent, chilling the mixture and filtering the mixture.

2. The improved method of dewaxing mineral oils and deoiling waxes which comprises adding to a waxy mineral oil prior to filtration about 0.001% to 5.000% by weight of a polymeric vinyl ester formed from monocarboxylic acids having between 8 and 24 carbon atoms in the hydrocarbon chain, said polymeric vinyl ester having a molecular weight of about 5,000 to 90,000, dissolving the mixture in a suitable solvent, chilling the mixture and filtering the mixture.

3. The improved method of dewaxing mineral oils and deoiling waxes which comprises adding to a waxy mineral oil prior to filtration about 0.005% to 1.000% by weight of a polymeric vinyl ester formed from monocarboxylic acids having between 8 and 24 carbon atoms in the hydrocarbon chain, said polymeric vinyl ester having a molecular weight of about 5,000 to 90,000, dissolving the mixture in a suitable solvent, chilling the mixture and filtering the mixture.

4. The improved method of dewaxing mineral oils and deoiling waxes which comprises adding to a waxy mineral oil prior to filtration about 0.001% to 5.000% by weight of a polymeric vinyl ester formed from monocarboxylic acids having about 16–18 carbon atoms in the hydrocarbon chain, said polymeric vinyl ester having a molecular weight of about 5,000 to 90,000, dissolving the mixture in a suitable solvent, chilling the mixture and filtering the mixture.

References Cited in the file of this patent

UNITED STATES PATENTS

| | | |
|---|---|---|
| 2,600,384 | Bauer et al. | June 17, 1952 |
| 2,600,385 | Bauer et al. | June 17, 1952 |
| 2,671,760 | Port et al. | Mar. 9, 1954 |
| 2,798,027 | Cohen | July 2, 1957 |

UNITED STATES PATENT OFFICE
CERTIFICATE OF CORRECTION

Patent No. 3,052,623            September 4, 1962

Roy T. Edwards et al.

It is hereby certified that error appears in the above numbered patent requiring correction and that the said Letters Patent should read as corrected below.

Column 3, EXAMPLE II, in the table under the heading "5" and opposite "Oil", for "80.4" read -- 90.4 --; column 6, line 4, for "(g./s.f.h.)" read -- (g/s.f/h) --.

Signed and sealed this 5th day of March 1963.

(SEAL)
Attest:

ESTON G. JOHNSON
Attesting Officer

DAVID L. LADD
Commissioner of Patents